M. H. Crane,
Making Metal Boxes.
Nº 70,811.  Patented Nov. 12, 1867.
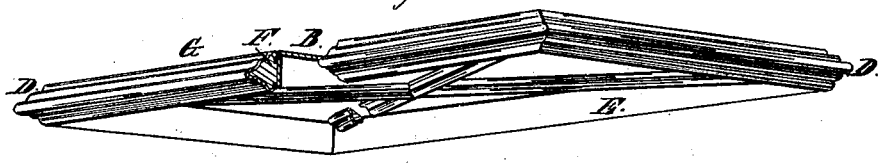
Fig. 2.
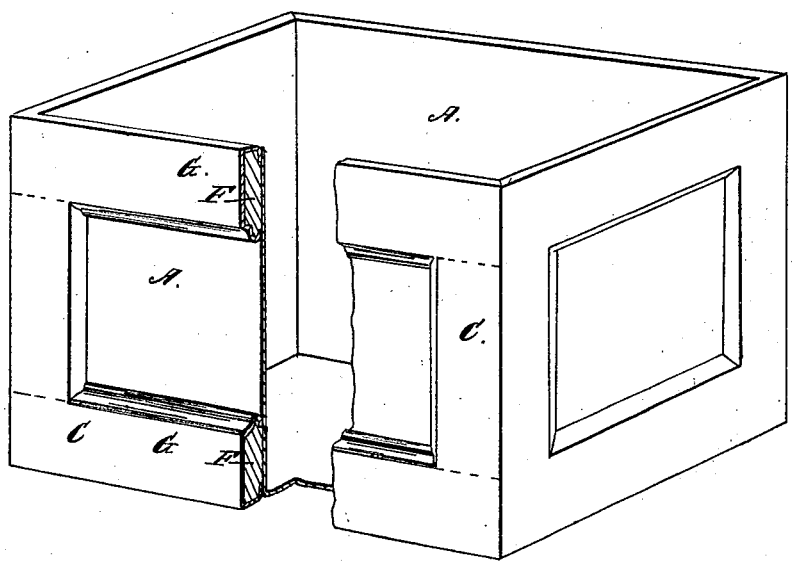
Fig. 1.
Witnesses.  Fig. 3  Inventor:
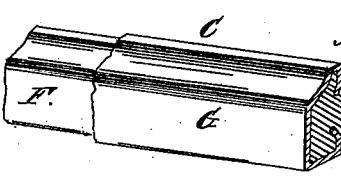

MARTIN H. CRANE, OF CINCINNATI, OHIO, ASSIGNOR TO CRANE, BREED & CO., OF THE SAME PLACE.

Letters Patent No. 70,811, dated November 12, 1867.

---

IMPROVEMENT IN THE CONSTRUCTION OF SHEET-METAL BOXES.

---

The Schedule referred to in these Letters Patent and making part of the same.

---

TO WHOM IT MAY CONCERN:

Be it known that I, MARTIN H. CRANE, of Cincinnati, Hamilton county, Ohio, have invented a new and useful improvement in the Manufacture of Sheet-Metal Vessels and Cases, &c.; and I hereby declare the following to be a full, clear, and exact description thereof, reference being had to the accompanying drawings, making part of this specification.

My invention consists in an improved mode of manufacturing various articles of sheet metal, such as bathing-tubs, trunks, sinks, &c., whereby great strength and lightness and elegance of finish are obtained.

Figure 1 is a partially-sectionized perspective view of a box or case embodying my invention.

Figure 2 is a lid or cover for the same.

Figure 3 shows a portion of one of the composite ribs or mouldings, previous to its application to the case.

The body A of the box or the body B of the lid may be formed in any approved way. In order to stiffen the same, and impart a pleasing finish with very slight increase of weight, I braze or solder to either the exterior surface, as at C and D, or to the interior surface, as at E, ribs or mouldings composed of strips F, of pine or other wood, tightly enveloped in sheet-metal casings G. These ribs or mouldings are constructed by drawing through a suitable die strips of wood of the proper form, and their metallic envelopes, so as to bind the two substances firmly together, and make of them in effect a single piece. The composite strip thus formed is then attached by soldering or brazing so as to form a stiffening-rib, flange, or moulding, as above stated.

I claim herein as new, and of my invention—

The mode of stiffening and ornamenting vessels made of sheet metal by the use of composite ribs or mouldings, of wood and metal, soldered to the exterior or interior surface of the vessel, substantially as set forth.

In testimony of which invention I hereunto set my hand.

M. H. CRANE.

Witnesses:
  GEO. H. KNIGHT,
  JAMES H. LAYMAN.